(12) United States Patent
Wang et al.

(10) Patent No.: US 11,139,930 B2
(45) Date of Patent: Oct. 5, 2021

(54) USER EQUIPMENT AND METHOD FOR PERFORMING REPETITION

(71) Applicant: Institute For Information Industry, Taipei (TW)

(72) Inventors: Hai-Han Wang, Taipei (TW); Chun-Che Chien, Taipei (TW)

(73) Assignee: Institute For Information Industry, Taipei (TW)

(*) Notice: Subject to any disclaimer, the term of this patent is extended or adjusted under 35 U.S.C. 154(b) by 188 days.

(21) Appl. No.: 16/536,176

(22) Filed: Aug. 8, 2019

(65) Prior Publication Data

US 2020/0052828 A1 Feb. 13, 2020

Related U.S. Application Data

(60) Provisional application No. 62/716,989, filed on Aug. 10, 2018.

(51) Int. Cl.
| | |
|---|---|
| *H04L 1/18* | (2006.01) |
| *H04W 72/04* | (2009.01) |
| *H04L 1/16* | (2006.01) |
| *H04W 76/27* | (2018.01) |
| *H04L 5/00* | (2006.01) |

(52) U.S. Cl.
CPC .......... *H04L 1/189* (2013.01); *H04L 1/1642* (2013.01); *H04L 1/1819* (2013.01); *H04L 5/0051* (2013.01); *H04W 72/042* (2013.01); *H04W 72/0446* (2013.01); *H04W 76/27* (2018.02)

(58) Field of Classification Search
CPC ..... H04L 1/189; H04L 1/1642; H04L 1/1819; H04L 1/1816; H04L 1/1858; H04L 1/08; H04L 72/0446
See application file for complete search history.

(56) References Cited

U.S. PATENT DOCUMENTS

| | | | |
|---|---|---|---|
| 2017/0272211 A1 | 9/2017 | Chen et al. | |
| 2018/0279315 A1* | 9/2018 | Salem | H04L 1/08 |
| 2019/0230689 A1* | 7/2019 | Cao | H04L 1/0068 |
| 2020/0044793 A1* | 2/2020 | Sundararajan | H04L 5/0037 |
| 2020/0053799 A1* | 2/2020 | Jeon | H04W 16/14 |

OTHER PUBLICATIONS

Yu et al., Uplink Scheduling and Link Adaptation for Narrowband Internet of Things Systems, Feb. 16, 2017, 11 pages (Year: 2017).*
Jacobsen et al., System Level Analysis of Uplink Grant-Free Transmission for URLLC, Dec. 2017, 6 pages (Year: 2017).*
Office Action to the corresponding Taiwan Patent Application rendered by the Taiwan Intellectual Property Office (TIPO) dated Feb. 27, 2020, 6 pages (including English translation summary).

* cited by examiner

*Primary Examiner* — Kent Krueger
(74) *Attorney, Agent, or Firm* — Skaar Ulbrich Macari, P.A.

(57) ABSTRACT

A user equipment determines a repetition sequence including a plurality of repetitions. The user equipment schedules the repetition sequence in a time slot or in a plurality of consecutive time slots, wherein at least one of the plurality of consecutive time slots is arranged to at least two of the plurality of repetitions. Then, the user equipment transmits the plurality of repetitions to a base station.

18 Claims, 16 Drawing Sheets

USER EQUIPMENT AND METHOD FOR PERFORMING REPETITION

PRIORITY

This application claims the benefit of priority based on U.S. Provisional Patent Application Ser. No. 62/716,989 filed on Aug. 10, 2018 and titled "LOW LATENCY CONFIGURED GRANT TRANSMISSION", the entirety of which is incorporated herein by reference.

FIELD

The present disclosure relates to a user equipment and a method for performing repetition. More specifically, the present disclosure relates to a user equipment and a method capable of transmitting a plurality of repetitions in a time slot.

BACKGROUND

When a user equipment in a conventional wireless communication system is intended to perform an uplink transmission (e.g., transmissions related to physical uplink shared channels (PUSCH)), it may use repetition to make sure that the receiver (e.g., a base station) is able to correctly decode the uplink data transmitted by the user equipment, thereby enhancing the reliability of the wireless communication system. FIG. 1 depicts a schematic view of the conventional uplink repetition. Referring to FIG. 1, when a user equipment has transmitted an uplink repetition R1 (which is the original transmission) in a time slot 10, it can only transmit another uplink repetition R2 (which is the first re-transmission) in the time slot 11 adjacent to the time slot 10. This is because the conventional uplink repetition is limited to that multiple repetitions cannot be transmitted in the same time slot. Therefore, as shown in FIG. 1, when the user equipment transmits the uplink repetition R1 in time points 106 and 107 of the time slot 10, usually it has to transmit the uplink repetition R2 in time points 116 and 117 of the time slot 11. As a result, although the conventional uplink repetition may enhance the reliability of the wireless communication system, it also increases the system delay. In view of this, it is very important in the art to improve the conventional uplink repetition.

SUMMARY

To solve at least the aforesaid problem, the present disclosure provides a user equipment. The user equipment may comprise a processor and a transceiver electrically connected with the processor. The processor may be configured to determine a repetition sequence comprising a plurality of repetitions. The processor may also be configured to schedule the repetition sequence on a time slot or on a plurality of consecutive time slots, and at least one of the plurality of consecutive time slots is arranged to at least two of the plurality of repetitions. The transceiver may be configured to transmit the plurality of repetitions to a base station.

To solve at least the aforesaid problem, the present disclosure also provides a method for performing repetition. The method may comprise the following steps of:

determining, by a user equipment, a repetition sequence, wherein the repetition sequence comprises a plurality of repetitions;

scheduling, by the user equipment, the repetition sequence on a time slot or on a plurality of consecutive time slots, wherein at least one of the plurality of consecutive time slots is arranged to at least two of the plurality of repetitions; and transmitting, by the user equipment, the plurality of repetitions to a base station Based on the above, in various embodiments, the user equipment is configured to transmit a plurality of repetitions (at least two repetitions) in a time slot. As a result, as compared to the conventional uplink repetition that can only transmit one repetition within a time slot, the embodiments realize decreasing the system delay while still maintaining the system reliability, and thus effectively improve the problem of the conventional uplink repetition mentioned above.

The aforesaid content is not intended to limit the present invention. Instead, the aforesaid content generally describes the technical problems that can be solved by the present invention, the technical means that can be adopted, and the technical effects that can be achieved, so that people having ordinary skill in the art can basically understand the present invention. People having ordinary skill in the art can further understand various embodiments of the present invention according to the attached figures and the content recited in the following embodiments.

DETAILED DESCRIPTION

Figure 1:
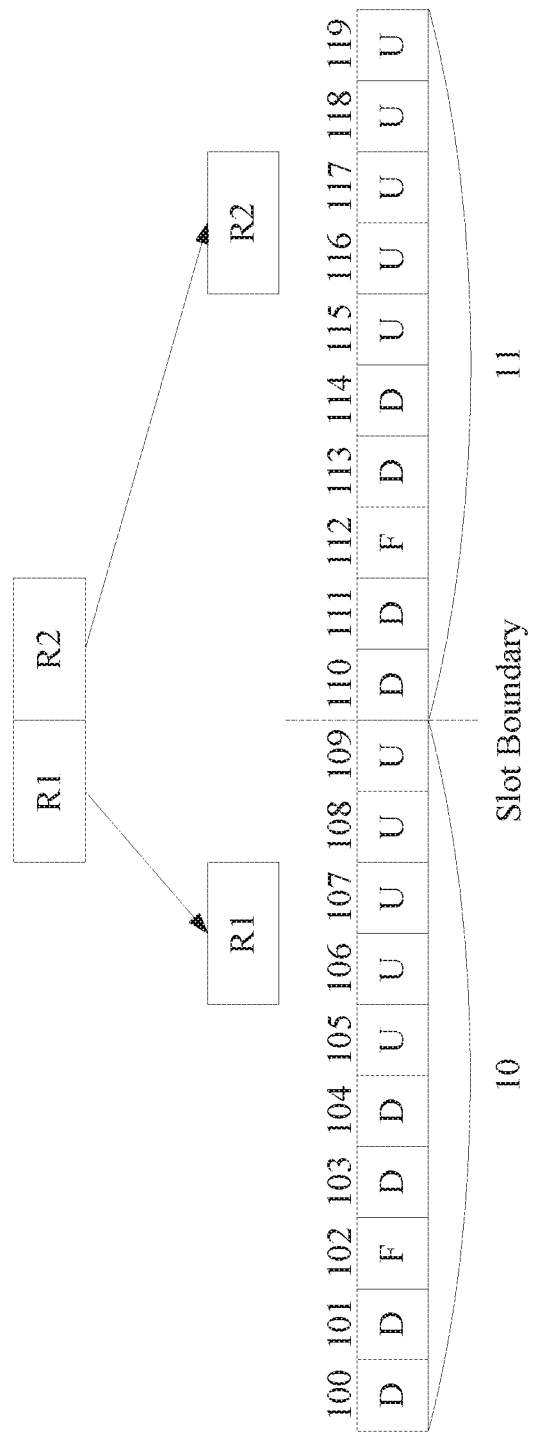
FIG. 1 depicts a schematic view of the conventional uplink repetition.

The exemplary embodiments described below are not intended to limit the present invention to any specific environment, applications, structures, examples, embodiments, processes or steps as described in these example embodiments. In the attached figures, elements not directly related to the present invention are omitted from depiction. In the attached figures, dimensional relationships among individual elements in the attached drawings are merely examples but not to limit the actual scale. Unless otherwise described, the same (or similar) element symbols may correspond to the same (or similar) elements in the following description. Unless otherwise described, the number of each element described below may be one or more under implementable circumstances.

The length of time slots, the symbol allocation of time slots, the length of periods, the redundancy versions (RVs) or the like shown in the drawings are merely for ease of description of various embodiments instead of limiting the present invention.

Figure 2:
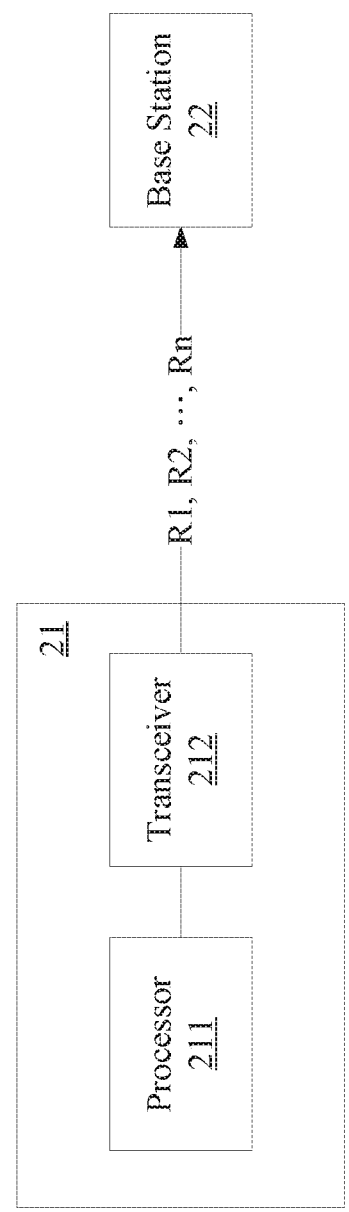
FIG. 2 depicts a schematic view of a wireless communication system according to one or more embodiments of the present invention.

FIG. 2 depicts a schematic view of a wireless communication system according to one or more embodiments of the present invention. The contents shown in FIG. 2 are merely for explaining the embodiments of the present invention instead of limiting the present invention.

Referring to FIG. 2, the wireless communication system 2 may be various a wireless communication system such as Long-Term Evolution (LTE) communication system or New Radio (NR) communication system. The wireless communication system 2 may comprise one or more user equipment 21, one or more base stations 22 and one or more core network (not shown). Each of the user equipment 21 may basically comprise a processor 211 and a transceiver 212 electrically connected with the processor 211. The electrical connection between the processor 211 and the transceiver 212 may be direct connection (i.e., connection not via other elements) or indirect connection (i.e., connection via other elements). Depending on different requirements, the base stations 22 may be various types of base stations which are for example but not limited to: Macrocells, Microcells or Picocells or the like. The architecture of the base stations 22 may comprise a Centralized Unit (CU) and/or one or more Distributed Units (DU). The user equipment 21 may be various electronic devices supporting the wireless communication standards adopted by the wireless communication system 2, which are for example but not limited to: mobile phones, tablet computers, laptop computers or the like.

The processor 211 may be a microprocessor or a microcontroller capable of signal processing. The microprocessor or microcontroller is a programmable specific integrated circuit which is capable of operating, storing, outputting/inputting or the like and may receive and process various encoded instructions, thereby performing various logic operations and arithmetic operations and outputting corresponding operational results. The processor 211 may be programmed to interpret various instructions so as to process data in the user equipment 21 and execute various operational procedures or programs.

The transceiver 212 may be constituted by a transmitter and a receiver, and may comprise for example but not limited to various communication elements such as an antenna, an amplifier, a modulator, a demodulator, a detector, an analog-to-digital converter, a digital-to-analog converter or the like. The transceiver 212 may be configured to enable the user equipment 21 to communicate and exchange data with an external device. For example, as shown in FIG. 2, the transceiver 212 of the user equipment 21 may communicate with the base station 22, e.g., transmitting a plurality of repetitions R1, R2, . . . , Rn to the base station 22.

Figure 3:
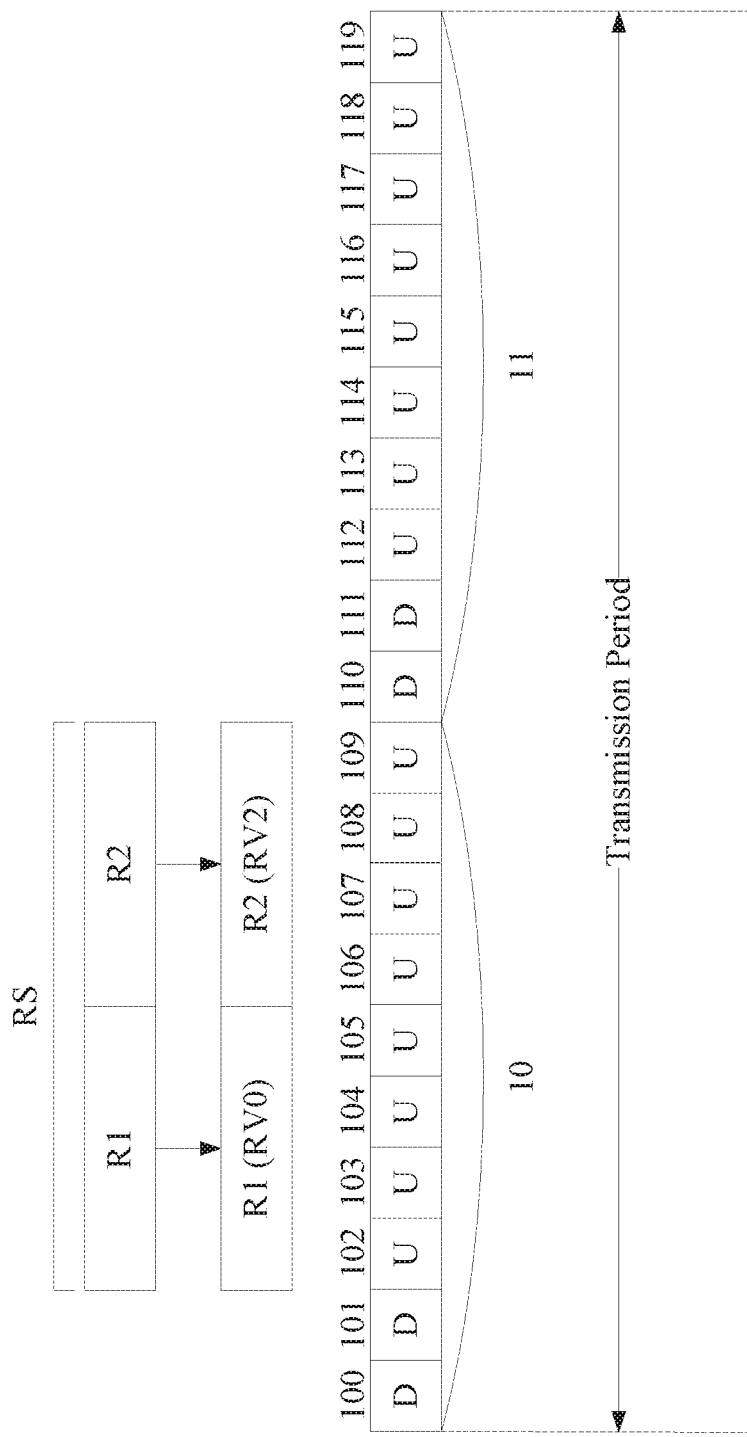
FIG. 3 depicts a schematic view of scheduling a repetition sequence according to one or more embodiments of the present invention.

FIG. 3 depicts a schematic view of scheduling a repetition sequence according to one or more embodiments of the present invention. The contents shown in FIG. 3 are merely for explaining the embodiments of the present invention instead of limiting the present invention.

Referring to FIG. 2 and FIG. 3 together, by way of an example, the processor 211 may be configured to determine a repetition sequence RS and a starting time point of the repetition sequence RS. Then, the processor 211 may determine the transmission occasions of the repetitions R1 and R2 according to the repetition sequence RS and two consecutive time slots 10 and 11 with their respective symbol allocations. Each of the time slots 10 and 11 comprises a plurality of time points, and each time point may represent the time length of a symbol. For example, as shown in FIG. 3, assuming that the repetition sequence RS comprises a repetition R1 and a repetition R2 and its starting time point is the time point 102, the processor 211 may determine the time points 102, 103, 104 and 105 as the transmission occasions of the repetition R1, and determine the time points 106, 107, 108 and 109 as the transmission occasions of the repetition R2. After determining the transmission occasions of the repetitions R1 and R2, the processor 211 may further perform a redundancy version (RV) mapping to the repetitions R1 and R2 according to a redundancy version sequence. For example, assuming that the redundancy version sequence is "RV0 RV2 RV1 RV3", the processor 211 may configure the first redundancy version "RV0" for the transmission occasions of the repetition R1 (i.e., the time points 102, 103, 104 and 105), and configure the second redundancy version "RV2" for the transmission occasions of the repetition R2 (i.e., the time points 106, 107, 108 and 109). According to the abovementioned configurations, the transceiver 212 may transmit the repetition R1 using the redundancy version "RV0" to the base station 22, and may transmit the repetition R2 using the redundancy version "RV2" to the base station 22. Therefore, the user equipment 21 may transmit two repetitions in a time slot (i.e., the time slot 10), and may apply two redundancy versions in a time slot.

As shown in FIG. 3, assuming that a transmission period of uplink transmissions of the wireless communication system 2 is configured to be twenty time points (i.e., two time slots), the transceiver 212 transmits the repetitions R1 and R2 within a transmission period. In some embodiments, assuming that the transmission period is configured to be no more than eight time points (e.g., two, four, six or eight time points), the transceiver 211 can transmit the repetitions R1 and R2 across multiple transmission periods.

In some embodiments, the processor 211 may determine the repetition sequence RS and the starting time point of the repetition sequence RS according to a resource allocation of uplink transmissions which is received from the base station 22 in advance by the transceiver 212. The resource allocation may comprise for example but not limited to: a Starting symbol Length Indication Value (SLIV), a duration of the transmission period, a repetition number, one or more redundancy version sequences and so on, wherein the SLIV may indicate starting time point and the duration of repetitions. In some embodiments, when the uplink transmissions between the user equipment 21 and the base station 22 are based on a configured grant transmission (i.e., grant-free transmission) mode, the base station 22 may transmit a Radio Resource Control (RRC) message including the resource allocation to the transceiver 212 of the user equipment 21. In some embodiments, when the uplink transmissions between the user equipment 21 and the base station 22 are based on a dynamic grant transmission mode, the base station 22 may transmit Downlink Control Information (DCI) including the resource allocation to the transceiver 212 of the user equipment 21, and in case the DCI cannot include the whole resource allocation, the base station 22 may provide the resource allocation in a collaborative way by transmitting an RRC message as well as the DCI to the transceiver 212 of the user equipment 21.

In some embodiments, in order to determine the repetition sequence RS and the starting time point of the repetition sequence RS, the processor 211 may determine the duration of each repetition of the repetition sequence RS or the duration of the repetition sequence RS according to the SLIV and the repetition number. For example, the SLIV may comprise two parameters named "S" and "L", which indicate that the starting time point of the repetition sequence RS is the "$S^{th}$" time point of the time slot and the duration of the repetition sequence RS includes "L" time points. Taking FIG. 3 for example, the starting time point of the repetition sequence RS is directed to the time point 102 of the time slot 10 and the duration of the repetition sequence RS includes eight time points because the SLIV now shows "S=2" and "L=8." However, if the SLIV shows "S=0" and "L=8", the starting time point of the repetition sequence RS may be changed to the time point 100 of the time slot 10, and the duration of the repetition sequence RS includes eight time points. The repetition number can be represented by a parameter named "repK". When "L mod repK=m" and "m≠0" are satisfied, the processor 211 may determine that the duration of each of the first "m" repetitions includes $$"\left\lceil \frac{L}{repK} \right\rceil"$$

time points, and that the duration of each of the remaining repetitions includes $$"\left\lfloor \frac{L}{repK} \right\rfloor"$$

time points. When "L mod repK=0" is satisfied, the processor 211 may determine that the duration of each of the repetitions includes $$"\frac{L}{repK}"$$

time points. Alternatively, for another example, the parameter "L" may indicates that the duration of one repetition includes "L" time points while the parameter "S" still indicates that the starting time point of the repetitions sequence RS is the "$S^{th}$" time point of the time slot. In this case, the processor 211 may determine a product of "L" and "repK" which still means the repetition number as the duration of the repetition sequence RS, and the starting time point of each repetition is the time point next to the ending time point of its previous repetition.

Figure 4A:
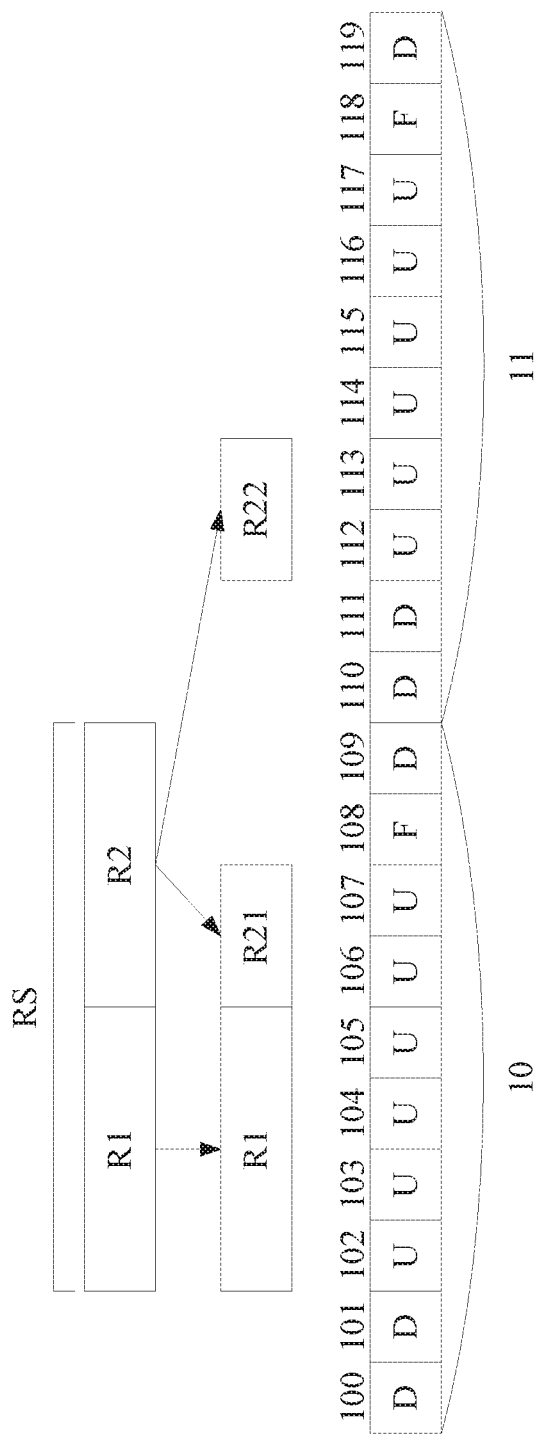
FIGS. 4A-4C depicts schematic views of arranging a repetition when the symbol location corresponding to the repetition is unusable in a time slot according to one or more embodiments of the present invention.
Figure 4B:
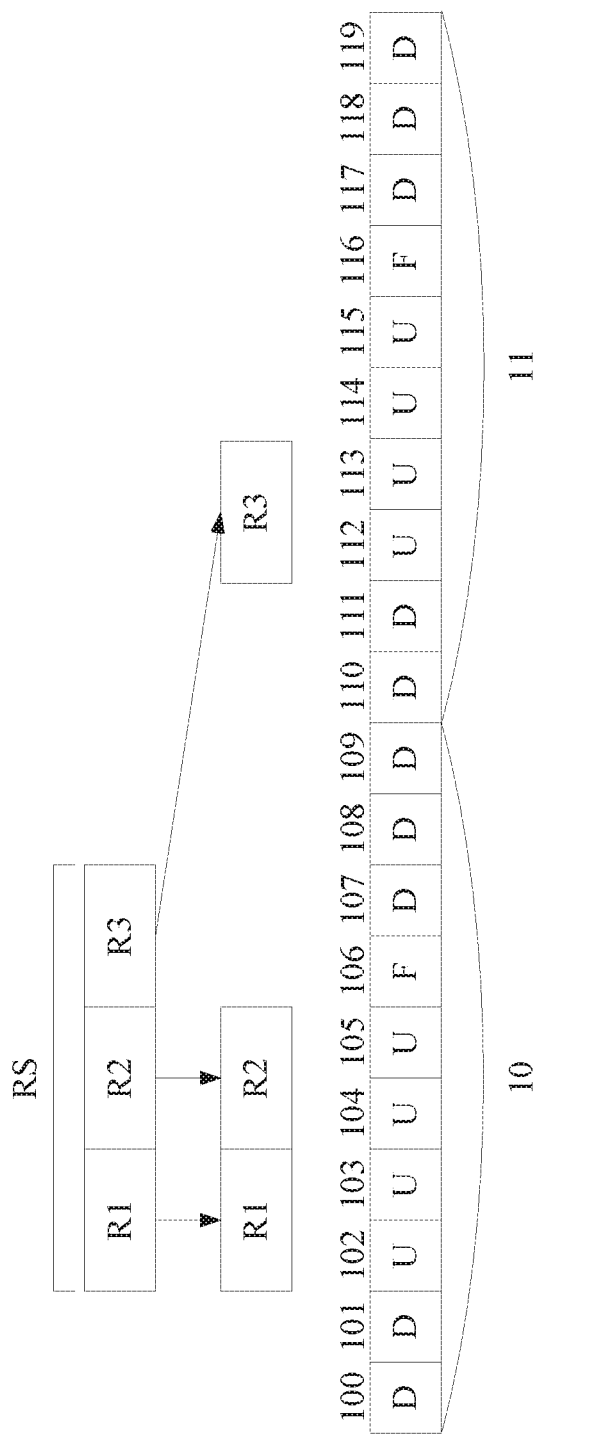
Figure 4C:
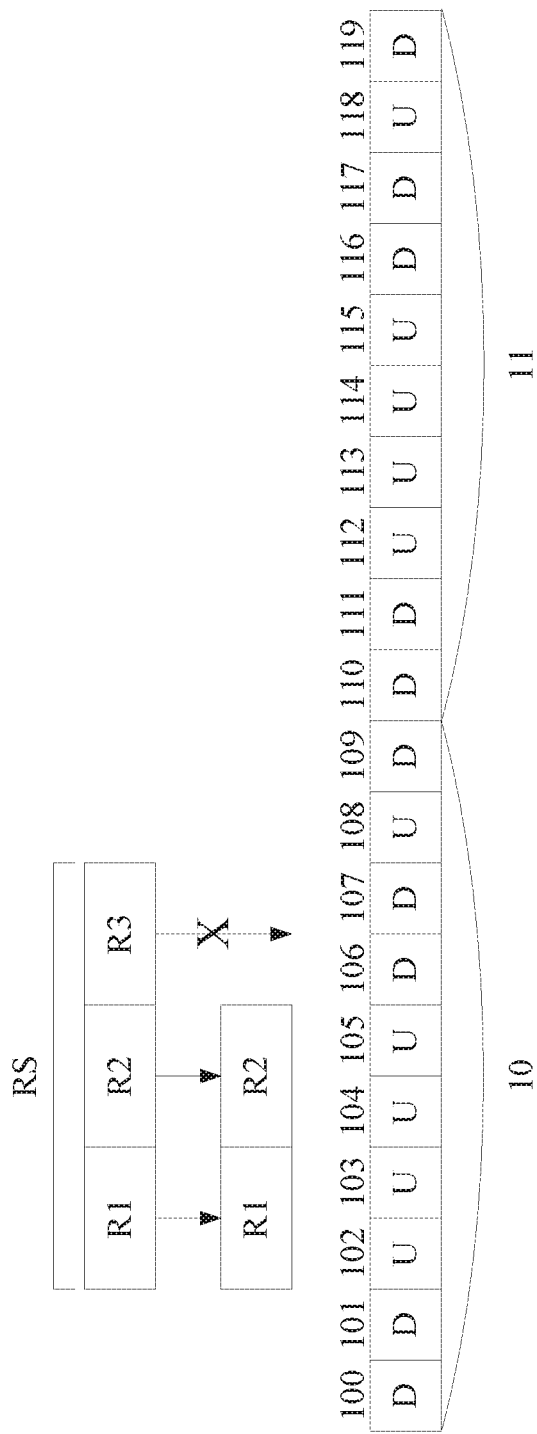

In some embodiments, after the processor 211 determines the starting time point and the duration of the repetitions sequence RS, it is possible that one or more symbol location corresponding to a repetition of the repetition sequence RS is unusable in a time slot (e.g., the corresponding symbol belongs to the opposite transmission direction or the symbol is a semi-static flexible symbol that is unusable now), and under such circumstances, the processor 211 may take further actions to the repetition as described later. FIGS. 4A-4C depicts schematic views of arranging a repetition when the symbol location corresponding to the repetition is unusable in a time slot according to one or more embodiments of the present invention. The contents shown in FIGS. 4A-4C are merely for explaining the embodiments of the present invention instead of limiting the present invention. The details will be described hereinafter with reference to the U.S. provisional application.

Referring to FIG. 2 and FIG. 4A together, by way of an example, the repetition sequence RS comprises the repetitions R1 and R2, each of which requires four time points to be transmitted. In this example, the processor 211 may divide the repetition R2 because some symbol location corresponding to the repetition R2 is unusable in the originally scheduled time slot 10. Specifically, since the symbols of the time points 108 and 109 of the time slot 10 are the semi-flexible symbol F and a downlink symbol D respectively, the processor 211 may divide the repetition R2 into two partitions, and transmit the former partition (i.e., a repetition R21) of the repetition R2 at the time points 106 and 107 of the time slot 10, and transmit the latter partition (i.e., a repetition R22) of the repetition R2 at the time points 112 and 113 of the time slot 11.

Optionally, in some embodiments, the processor 211 may divide a repetition and then drop the latter partition of the repetition when the symbol location corresponding to the repetition is unusable in a time slot. Taking FIG. 4A as an example, the processor 211 may only use the time points 106 and 107 for transmitting the former partition (i.e., the repetition R21) of the repetition R2 and drop the latter partition (i.e., the repetition R22) of the repetition R2.

Referring to FIG. 2 and FIG. 4B together, by way of another example, the repetition sequence RS comprises the repetitions R1, R2 and R3, each of which requires two time points to be transmitted. In this example, the processor 211 may postpone the repetition R3 because the symbol location corresponding to the repetition R3 is unusable in the time slot 10 (i.e., the time point 106 arranged to the semi-static flexible symbol F and the time point 107 arranged to the downlink symbol D). The processor 211 may keep postponing the repetition R3 as long as next symbol location is still unusable. For example, the processor 211 postpones the repetition R3 thrice, since the time points 108 and 109 arranged to the downlink symbol D are unusable, and the time points 110 and 111 arranged to the downlink symbol D are unusable either. That is, the processor 211 may postpone the transmission occasions of the repetition R3 from the time points 106 and 107 to the time points 112 and 113.

Referring to FIG. 2 and FIG. 4C together, by way of another example, the repetition sequence RS comprises the repetitions R1, R2 and R3, each of which requires two time points to be transmitted. In this example, the processor 211 may drop the repetition R3 because the symbol location corresponding to the repetition R3 is unusable in the time slot 10 and the number of postponement of the repetition R3 has reached a threshold value. Specifically, a maximum number of postponement (e.g., two times) may be configured by the base station 22 and the user equipment 21 together, and the processor 211 may drop the repetition R3 when the number of postponement of the transmission occasions of the repetition R3 have reached the maximum number of postponement since the transmission occasions of the repetition R3 were unusable during the postponement.

In some embodiments, a parameter "maxTimeWindow" and a timer may be configured by the base station 22 and the user equipment 21 together, and the timer is activated when the repetition R1 starts. When the timer reaching the value of the parameter "maxTimeWindow" (e.g., ten time points), the processor 211 may drop the repetition R3, which is not transmitted due to the postponements.

In some embodiments, the processor 211 may directly drop a repetition when the symbol location corresponding to the repetition is unusable in a time slot. Taking FIG. 4A as an example, the processor 211 may directly drop the repetition R2. Taking FIG. 4B as an example, the processor 211 may directly drop the repetition R3.

In some embodiments, when the uplink transmissions between the user equipment 21 and the base station 22 are based on the dynamic-grant transmission mode, and the user equipment 21 is not configured to monitor dynamic slot format information (dynamic-SFI), the transceiver 212 may receive an indication regarding whether to use the semi-static flexible symbols F in the uplink transmissions other than the initial transmission from the base station 22, and the indication comprises the number of designated time slots and the number of semi-static flexible symbols F that are usable/unusable in the designated time slots. For example, when the indication transmitted from the base station 22 indicates that the designated number of time slot is one and the number of unusable semi-static flexible symbol is also one, the processor 211 may use other semi-static flexible symbols F than the first semi-static flexible symbol F after the downlink symbol D in the next time slot of the time slot in which the initial transmission (i.e., the first (set) of transmission occasion(s)) is transmitted. However, when the remaining transmission occasions span to the other time slots than the designated time slot, the processor 211 still uses only the uplink symbols U to perform the uplink transmissions except the initial transmission. In some embodiments, the indication may be transmitted from the base station 22 to the transceiver 212 via DCI. In some embodiments, the number of designated time slots and the number of semi-static flexible symbols F that are usable/unusable in the designated time slots may be transmitted from the base station 22 to the transceiver 212 via an RRC message. In some embodiments, the number of designated time slots may be transmitted from the base station 22 to the transceiver 212 via the RRC message, and the number of semi-static flexible symbols F that are usable/unusable in the designated time slots may be transmitted from the base station 22 to the transceiver 212 via the DCI. In some embodiments, the number of designated time slots and the number of semi-static flexible symbols F that are usable/unusable in the designated time slots may be transmitted from the base station 22 to the transceiver 212 via the DCI. The user equipment 21 uses the semi-static flexible symbol F for the uplink transmissions of the initial transmission according to the indication of the DCI when the symbol used for the initial transmission indicated by the DCI corresponds to the semi-static flexible symbol F.

On the other hand, when the user equipment 21 is configured to monitor the dynamic-SFI, then the user equipment 21 performs the uplink transmissions according to the dynamic-SFI in the time slot that is not indicated by the RRC message or the DCI if the user equipment 21 has monitored the dynamic-SFI, and the user equipment 21 only uses the uplink symbols U for uplink transmissions in the time slot that is not indicated by the RRC message or the DCI if the user equipment 21 has not monitored the dynamic-SFI. The base station 22 must ensure that the format of the time slot indicated by the dynamic-SFI is consistent with the number of usable/unusable semi-static flexible symbol F indicated by the RRC message or the DCI.

In some embodiments, when the uplink transmissions between the user equipment 21 and the base station 22 are based on the configured-grant transmission mode and the user equipment 21 is configured to monitor the dynamic-SFI, the user equipment 21 performs the uplink transmissions according to the dynamic-SFI if it has monitored the dynamic-SFI, and performs the uplink transmissions using only the uplink symbols U if it has not monitored the dynamic-SFI. In some embodiments, the user equipment 21 also performs the uplink transmissions using only the uplink symbols U if it is not configured to monitor the dynamic-SFI.

Figure 5A:
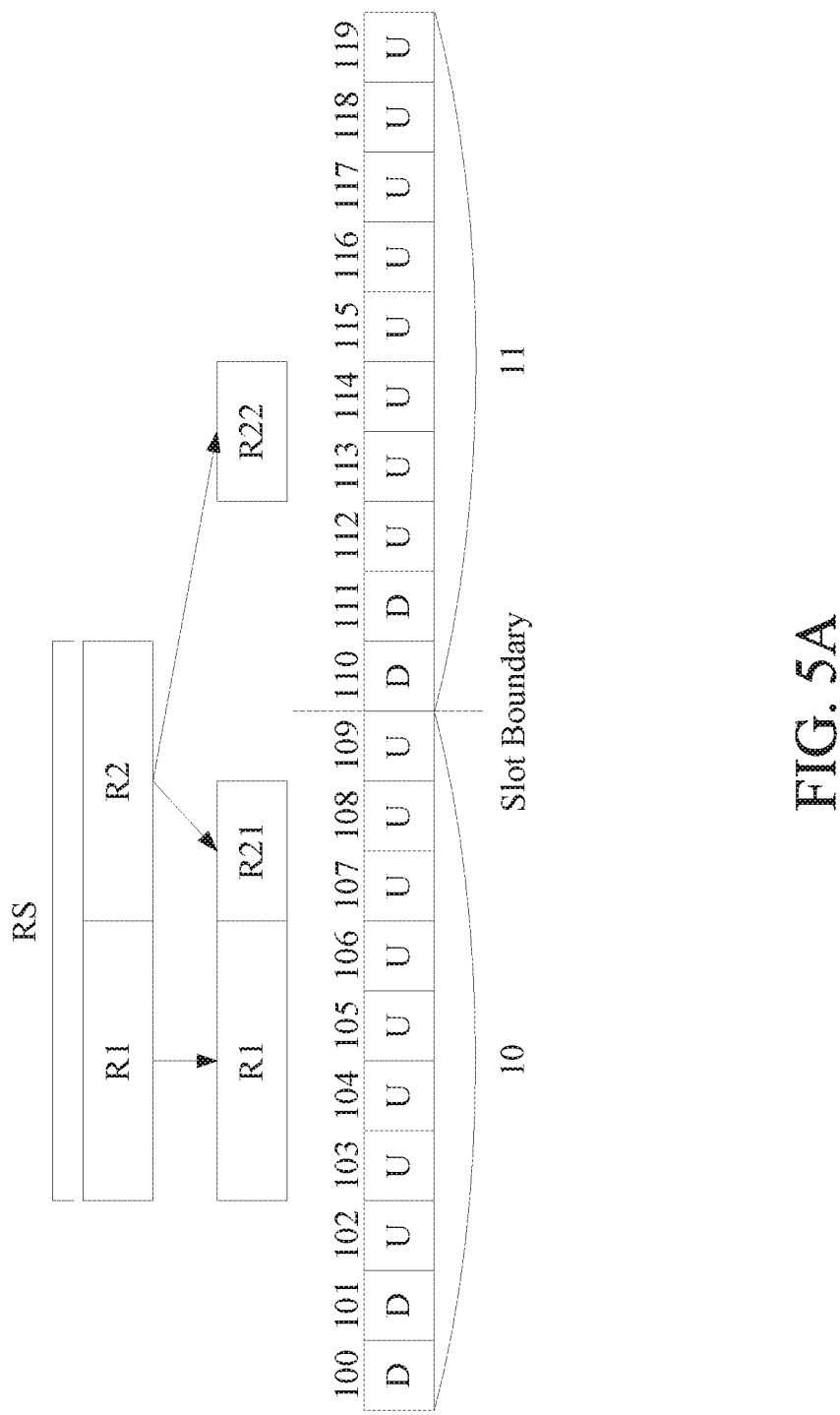
FIGS. 5A-5C depicts schematic views of arranging a repetition when the repetition crosses a slot boundary according to one or more embodiments of the present invention.
Figure 5B:
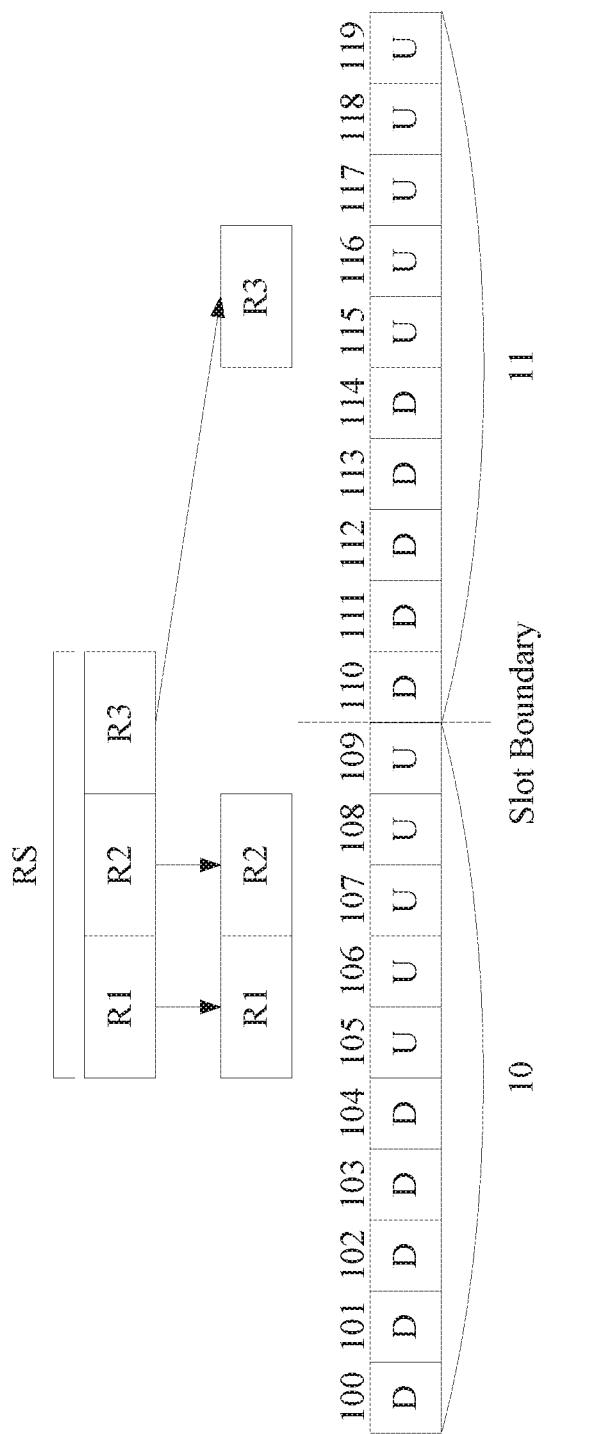
Figure 5C:
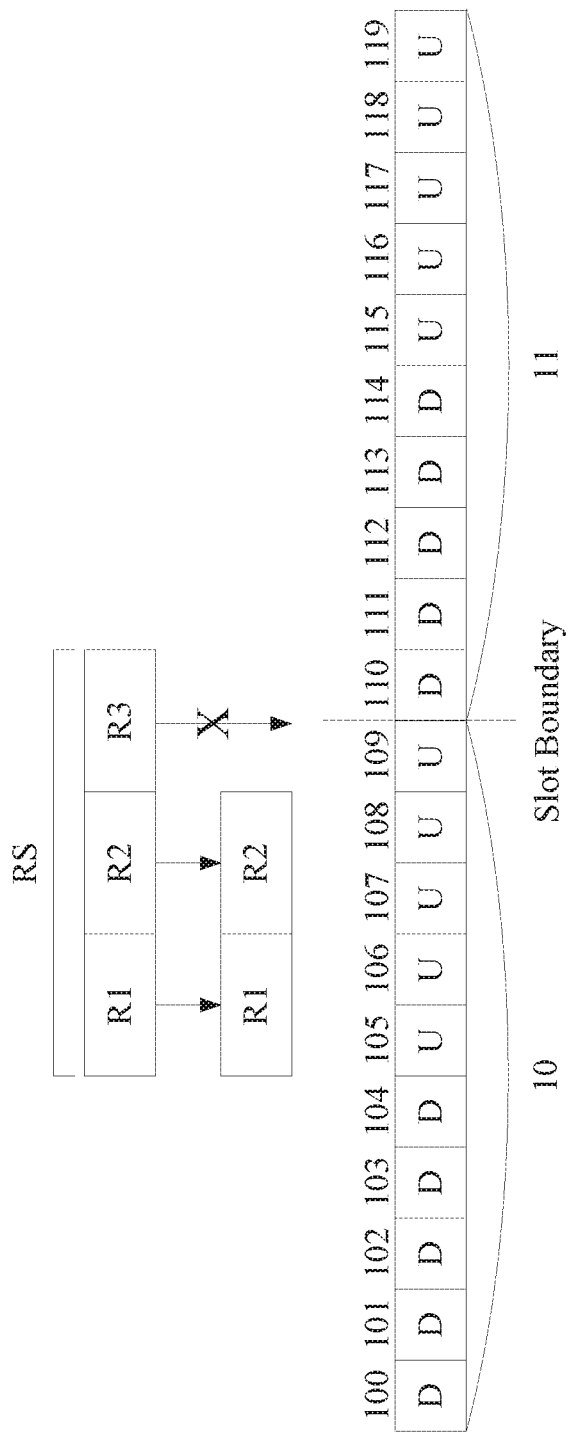

In some embodiments, it is possible that a repetition crosses a slot boundary after the processor 211 determines the starting time point and the duration of the repetition sequence RS, and under such circumstances, the processor 211 may take further actions to the repetition as described later. FIGS. 5A-5C depicts schematic views of arranging a repetition when the repetition crosses a slot boundary according to one or more embodiments of the present invention. The contents shown in FIGS. 5A-5C are merely for explaining the embodiments of the present invention instead of limiting the present invention. The details will be described hereinafter with reference to the U.S. provisional application.

Referring to FIG. 2 and FIG. 5A together, by way of an example, the repetition sequence RS comprises the repetitions R1 and R2, each of which requires four time points to be transmitted. In this example, the processor 211 may divide the repetition R2 because the repetition R2 crosses the slot boundary between the time slots 10 and 11. That is, the processor 211 may divide the repetition R2 into two partitions, transmit the former partition (i.e., the repetition R21) of the repetition R2 at the time points 107 and 108 of the time slot 10, and transmit the latter partition (i.e., a repetition R22) of the repetition R2 at the time points 113 and 114 of the time slot 11.

Optionally, in some embodiments, when a repetition crosses a slot boundary the processor 211 may divide the repetition and then drop the latter partition of the repetition. Taking FIG. 5A for example, the processor 211 may transmit the former partition (i.e., the repetition R21) of the repetition R2, and drop the latter partition (i.e., the repetition R22) of the repetition R2.

Referring to FIG. 2 and FIG. 5B together, by way of another example, the repetition sequence RS comprises the repetitions R1, R2 and R3, each of which requires two time points to be transmitted. In this example, the processor 211 may postpone the repetition R3 because the repetition R3 crosses the slot boundary between the time slots 10 and 11. The processor 211 may keep postponing the repetition R3 as long as next symbol location is still unusable. For example, the processor 211 postpones the repetition R3 thrice because the time points 111 and 112 arranged to the downlink symbol D are unusable, and the time points 113 and 114 arranged to the downlink symbol D are unusable either. That is, the processor 211 may postpone the transmission occasions of the repetition R3 from the time points 109 and 110 to the time points 115 and 116.

Referring to FIG. 2 and FIG. 5C together, by way of another example, the repetition sequence RS comprises the repetitions R1, R2 and R3, each of which requires two time points to be transmitted. In this example, the processor 211 may drop the repetition R3 when the repetition R3 crosses the slot boundary between the time slots 10 and 11. Specifically, a maximum number of postponement (e.g., two times) may be configured by the base station 22 and the user equipment 21 together, and the processor 211 may drop the repetition R3 when the number of postponement of the transmission occasions of the repetition R3 have reached the maximum number of postponement since the transmission occasions of the repetition R3 crossed a slot boundary and/or the were unusable during the postponement.

In some embodiments, a parameter "maxTimeWindow" and a timer may be configured by the base station 22 and the user equipment 21 together, and the timer is activated when the repetition R1 starts. When the timer reaches the value of the parameter "maxTimeWindow" (e.g., ten time points), the processor 211 may drop the repetition R3, which is not transmitted due to the postponements.

In some embodiments, the processor 211 may directly drop a repetition when the symbol location corresponding to the repetition crosses a slot boundary. Taking FIG. 5A as an example, the processor 211 may directly drop the repetition R2. Taking FIG. 5B as an example, the processor 211 may directly drop the repetition R3.

In some embodiments, the processor 211 may directly drop all or a part of a repetition when the time points for transmitting a Physical Uplink Control Channel (PUCCH) overlap with the transmission occasions of the repetition.

In some embodiments, when the uplink transmissions between the user equipment 21 and the base station 22 are based on the dynamic-grant transmission mode, the transceiver 212 may receive DCI from the base station 22, and the DCI indicates whether a DeModulation Reference Signal (DMRS) can perform Frequency Division Multiplexing (FDM) with the uplink data.

In some embodiments, when the uplink transmissions between the user equipment 21 and the base station 22 are based on the configured-grant transmission mode, the transceiver 212 may receive an RRC message from the base station 22, and the RRC message indicates whether a DMRS can perform Frequency Division Multiplexing (FDM) with the uplink data.

In some embodiments, after determining the transmission occasions for all of the repetitions, the processor 211 may perform a redundancy version mapping to all of the repetitions. FIGS. 6A-6D depicts schematic views of performing Redundancy Version (RV) mapping to the plurality of repetitions according to a preset rule, according to one or more embodiments of the present invention. The contents shown in FIGS. 6A-6D are merely for explaining the embodiments of the present invention instead of limiting the present invention. The details will be described hereinafter with reference to the U.S. provisional application.

Figure 6A:
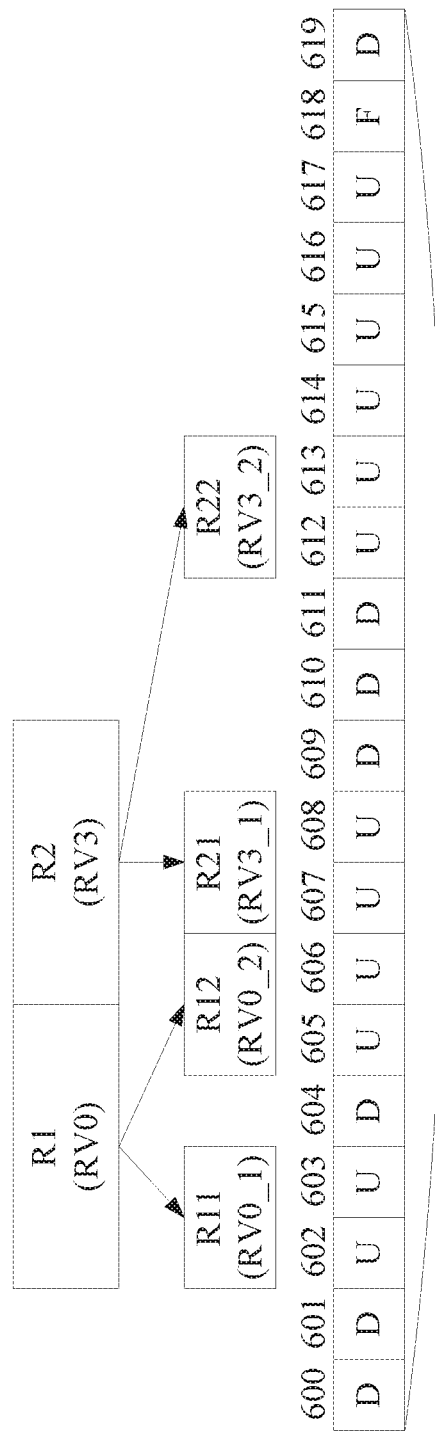
FIGS. 6A-6D depicts schematic views of performing Redundancy Version (RV) mapping to a plurality of repetitions according to a preset rule, according to one or more embodiments of the present invention.

Referring to FIG. 2 and FIG. 6A together, by way of an example, the redundancy version sequence that the base station 22 configured to the user equipment 21 is "RV0 RV3 RV0 RV3", and the processor 211 of the user equipment 21 configures the redundancy version RV0 and the redundancy version RV3 to the repetitions R1 and R2 respectively. In this example, the processor 211 may configure the redundancy version which has been configured to a repetition to every partition divided from the repetition. For instance, when the repetition R1 is divided into the repetitions R11 and R12 in the time slot 6, the processor 211 may configure the redundancy versions RV0_1 and RV0_2 to the repetitions R11 and R12 respectively, wherein the redundancy version RV0_2 is the subsequent bits of the redundancy version RV0_1. Moreover, when the repetition R2 is divided into the repetitions R21 and R22 in the time slot 6, the processor 211 may configure the redundancy versions RV3_1 and RV3_2 to the repetitions R11 and R12 respectively, wherein the redundancy version RV3_2 is the subsequent bits of the redundancy version RV3_1.

Figure 6B:
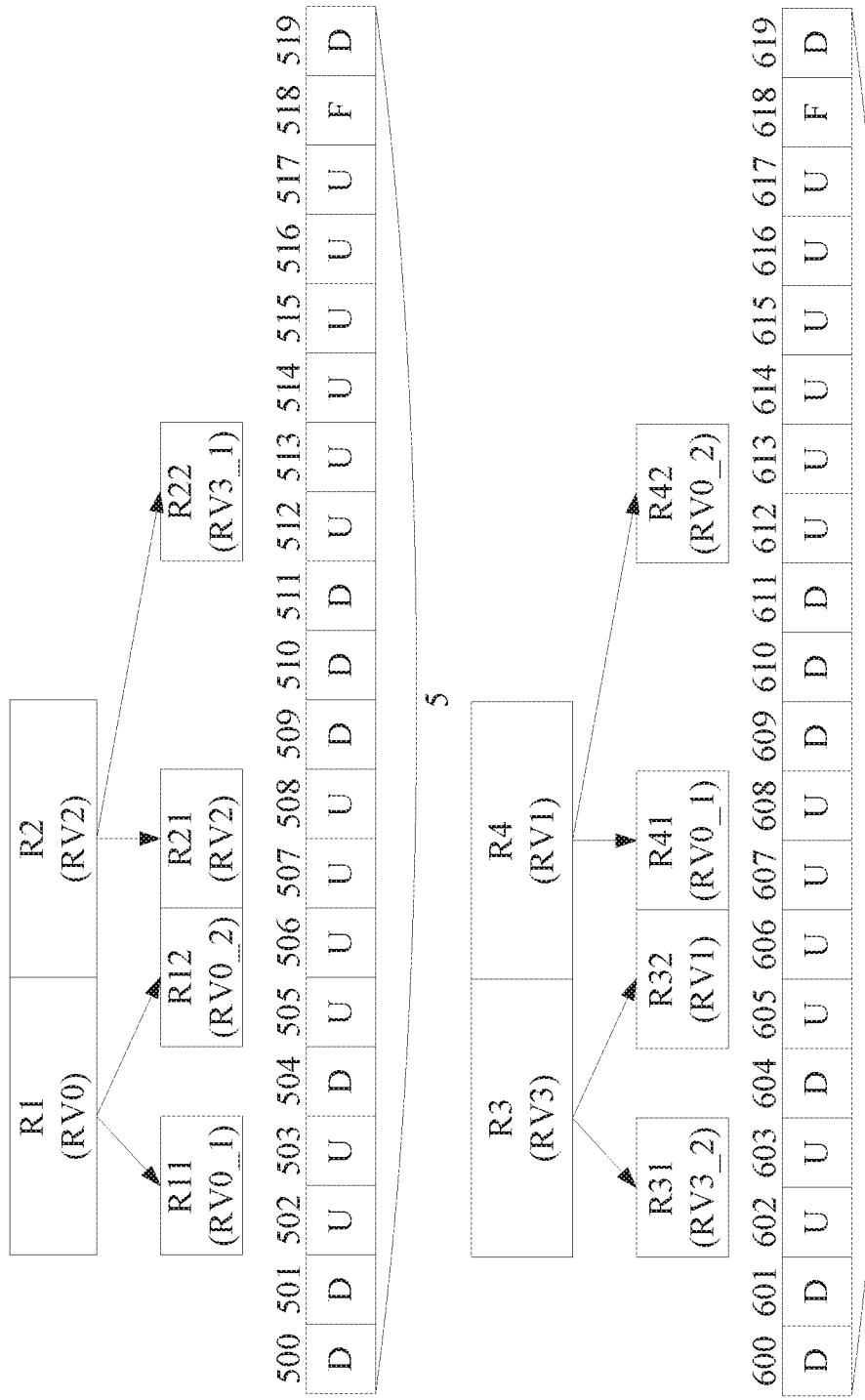

Referring to FIG. 2 and FIG. 6B together, by way of another example, the redundancy version sequence that the base station 22 configured to the user equipment 21 is "RV0 RV3 RV2 RV1", and the processor 211 of the user equipment 21 configures the redundancy version RV0, the redundancy version RV3, the redundancy version RV_2 and the redundancy version RV1 to the repetitions R1, R2, R3 and R4 respectively. In this example, the processor 211 may increase the number of usage of the redundancy versions RV0 and RV3. Specifically, it is assumed that in the time slot 5, the repetition R1 is divided into the repetitions R11 and R12, and the repetition R2 is divided into the repetitions R21 and R22, whereas in the time slot 6, the repetition R3 is divided into the repetitions R31 and R32, and the repetition R4 is divided into the repetitions R41 and R42. Normally the processor 211 shall sequentially configure the redundancy versions RV0, RV3, RV2 and RV1 to the repetitions R11, R12, R21, R22, R31, R32, R41 and R42, but, in order to increase the number of usage of the redundancy versions RV0 and RV3, the processor 211 may respectively configure the redundancy versions RV0 and RV3 to any two consecutive repetitions. Taking FIG. 6B for example, the processor 211 may configure the redundancy versions RV0_1 and RV0_2 to the repetitions R11 and R12 respectively, wherein the redundancy version RV3_2 is the subsequent bits of the redundancy version RV3_1. Then, the processor 211 may configure the redundancy version RV2 to the repetition R21. After that, the processor 211 may configure the redundancy versions RV3_1 and RV3_2 to the repetitions R22 and R31 respectively, wherein the redundancy version RV3_2 is the subsequent bits of the redundancy version RV3_1. Then after that, the processor 211 may configure the redundancy version RV1 to the repetition R32. Finally, the processor 211 may again configure the redundancy versions RV0_1 and RV0_2 to the repetitions R41 and R42 respectively.

Figure 6C:
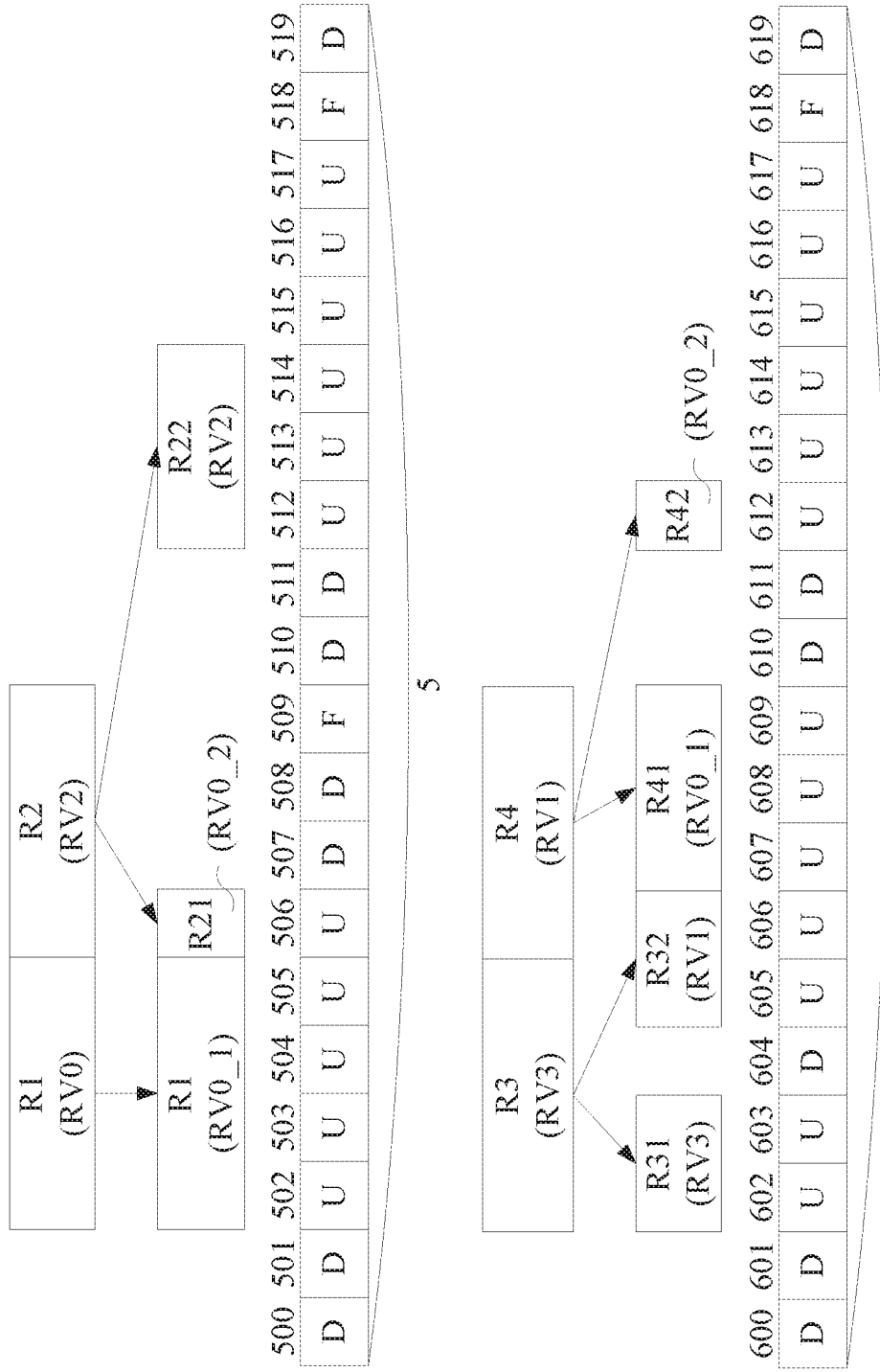

Referring to FIG. 2 and FIG. 6C together, by way of another example, the redundancy version sequence that the base station 22 configured to the user equipment 21 is "RV0 RV3 RV2 RV1", and the processor 211 of the user equipment 21 configures the redundancy version RV0, the redundancy version RV3, the redundancy version RV_2 and the redundancy version RV1 to the repetitions R1, R2, R3 and R4 respectively. In this example, the processor 211 may configure the same redundancy version as the previous/next repetition (after division) to the repetition (after division) that has a high coding rate. Specifically, it is assumed that in the time slot 5, the repetition R2 is divided into the repetitions R21 and R22, and in the time slot 6, the repetition R3 is divided into the repetitions R31 and R32, and the repetition R4 is divided into the repetitions R41 and R42. Normally the processor 211 shall sequentially configure the redundancy versions RV0, RV3, RV2 and RV1 to the repetitions R1, R21, R22, R31, R32, R41 and R42, but in order to reduce the problem of high coding rates, the processor 211 may configure the same redundancy version as the previous/next repetition (after division) to the repetition (after division) that has a high coding rate. Taking FIG. 6B for example, the processor 211 may configure the redundancy version RV0_1 to the repetition R1, and configure the redundancy version RV0_2 to the repetition R21 that has a high coding rate, wherein the redundancy version RV0_2 is the subsequent bits of the redundancy version RV0_1. Then, the processor 211 may sequentially configure the redundancy versions RV2, RV3 and RV1 to the repetitions R22, R31 and R32. Finally, the processor 211 may, again, configure the redundancy version RV0_1 to the repetition R41, and configure the redundancy version RV0_2 to the repetition R42 that has a high coding rate.

Figure 6D:
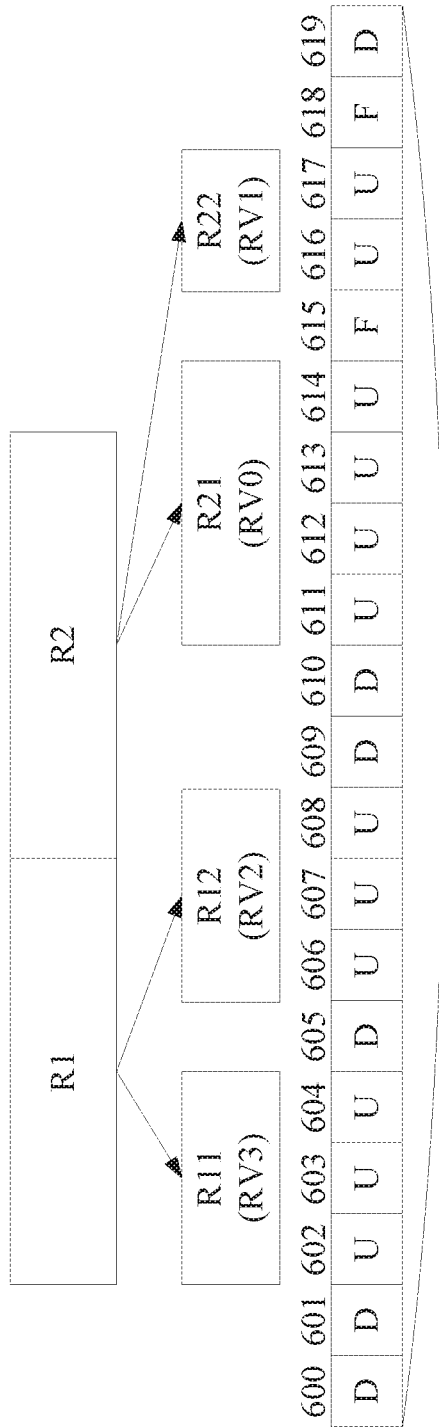

Referring to FIG. 2 and FIG. 6D together, by way of another example, the base station 22 configures four redundancy version sequences, i.e., "RV0 RV3 RV2 RV1", "RV2 RV0 RV3 RV1", "RV3 RV2 RV0 RV1" and "RV2 RV3 RV1 RV0", to the user equipment 21. In this example, the processor 211 may select one of the four redundancy version sequences such that the redundancy version RV0 is configured to the longest repetition. For instance, it is assumed that in the time slot 6, the repetition R1 is divided into the repetitions R11 and R12, and the repetition R2 is divided into the repetitions R21 and R22. Under such circumstance, the processor 211 may select the redundancy version sequence "RV3 RV2 RV0 RV1" and sequentially configure the redundancy versions RV3, RV2, RV0 and RV1 to the repetitions R11, R12, R21 and R22, such that the redundancy version RV0 is configured to the repetition R21, which is the longest among all repetitions.

Figure 7:
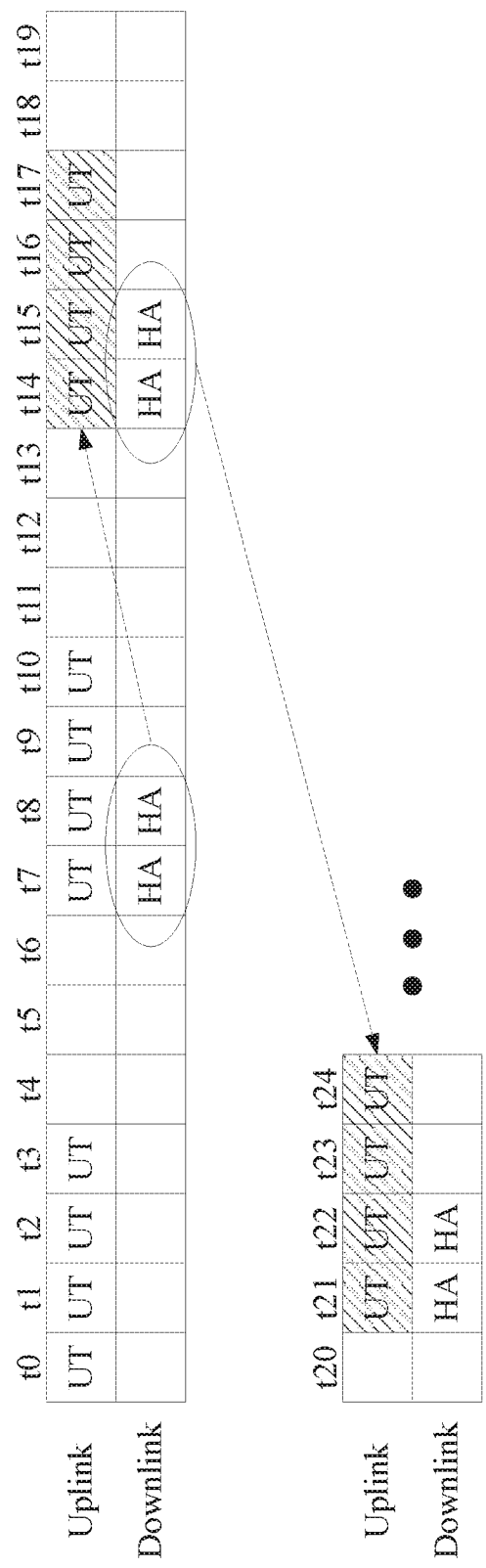
FIG. 7 depicts a schematic view of the user equipment terminating the remaining repetitions according to a hybrid automatic repeat request acknowledgement (HARQ ACK), according to one or more embodiments of the present invention.

FIG. 7 depicts a schematic view of the user equipment terminating the remaining repetitions according to a hybrid automatic repeat request acknowledgement (HARQ ACK), according to one or more embodiments of the present invention. The contents shown in FIG. 7 are merely for explaining the embodiments of the present invention instead of limiting the present invention. The details will be described hereinafter with reference to the U.S. provisional application.

Referring to FIG. 2 and FIG. 7 together, by way of an example, the uplink transmissions between the user equipment 21 and the base station 22 are based on the configured-grant transmission mode. In this example, firstly, the transceiver 212 performs uplink transmission UT at the time points t0-t3, and cannot monitor a Hybrid Automatic Repeat Request acknowledgement (HARQ-ACK) HA at the time points t0-t3 since the transmissions at those time points are the first transmission of the uplink transmission UT. Next, the transceiver 212 may perform another uplink transmission UT at the time points t7-t10. If the transceiver 212 detects the HARQ-ACK HA transmitted from the base station 22 at the time points t7-t8, then the subsequent uplink transmissions UT scheduled to the subsequent time points (e.g., the time points t14-t17 and t21-t24) may be terminated according to the HARQ-ACK HA. However, the transceiver 212 will continue to perform the uplink transmission UT at the time points t14-t17 if it does not detect the HARQ-ACK HA at the time points t7-t8. Likewise, if the transceiver 212 detects the HARQ-ACK HA transmitted from the base station 22 at the time points t14-t15, then the subsequent uplink transmissions UT scheduled to the subsequent time points (e.g., the time points t21-t24) may be terminated according to the HARQ-ACK HA. However, the transceiver 212 will continue to perform the uplink transmission UT at the time points t21-t24 if it does not detect the HARQ-ACK HA at the time points t14-t15. With such a mechanism, the user equipment 21 may terminate the subsequent repetitions after receiving the confirmation for the uplink data, and therefore the power consumption and resource occupation may be reduced.

In some embodiments, the HARQ-ACK HA can correspond to one or more HARQ process, and when the transceiver 212 receives the HARQ-ACK HA, the New Data Indicator (NDI) corresponding to the one or more HARQ process have been toggled and the processor 211 may stop the configured-grant timer (e.g., the parameter "configuredGrantTimer") related to the one or more HARQ process according to the HARQ-ACK HA.

Figure 8:
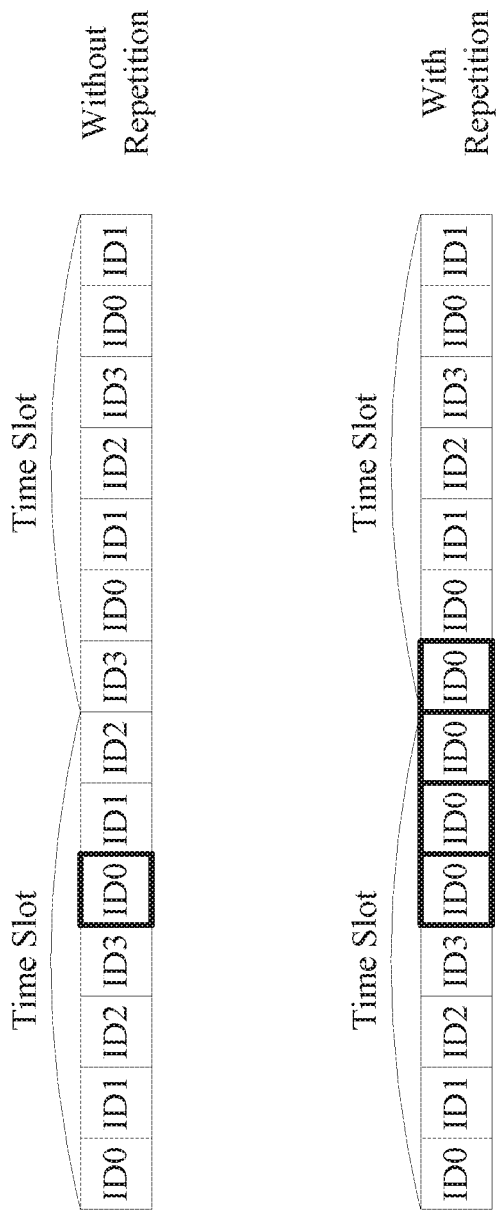
FIG. 8 depicts a schematic view of a plurality of repetitions corresponding to the same HARQ process according to one or more embodiments of the present invention.

FIG. 8 depicts a schematic view of a plurality of repetitions correspond to the same HARQ process according to one or more embodiments of the present invention. The contents shown in FIG. 8 are merely for explaining the embodiments of the present invention instead of limiting the present invention. The details will be described hereinafter with reference to the U.S. provisional application.

Under the circumstance that the user equipment 21 transmits a plurality of repetitions across a plurality of transmission periods, the user equipment 21 is not able to use the configured grant of the plurality of transmission periods to transmit the plurality of repetitions, since the HARQ process corresponding to the transmission occasions of each of the transmission periods are different, which also means that the HARQ process identifications (IDs) corresponding to the transmission occasions of each of the transmission periods are different. To solve such a problem, in some embodiments, the processor 211 may use the HARQ process ID corresponding to the first transmission period as the HARQ process ID of the subsequent transmission periods via defining an HARQ process bundle timer (e.g., a parameter named "HARQProcessBundleTimer"). Referring to FIG. 2 and FIG. 8 together, by way of an example, each time slot comprises seven transmission periods, wherein the duration of each transmission period includes two symbols, and each transmission period corresponds to one of the four HARQ process IDs ID0-ID3. As shown in the upper part of FIG. 8, the processor 211 may perform an uplink transmission with the HARQ process ID ID0 when the user equipment 21 does not perform repetition. As shown in the lower part of FIG. 8, the user equipment 21 performs the repetition from the fifth transmission period to the eighth transmission period, and the HARQProcessBundleTimer defined by the processor 211 is activated at the fifth transmission period. When the HARQProcessBundleTimer corresponding to the HARQ process ID of the first repetition is running, the repetitions other than the first repetition may still use the same HARQ process ID as the first repetition does, even if the configuredGrantTimer corresponding to the HARQ process ID of the first repetition is still running That is, the repetitions during the four transmission periods may be transmitted with the HARQ process ID ID0 corresponding to the fifth transmission period. In some embodiments, when the HARQProcessBundleTimer is running, it may express that an NDI of the HARQ process corresponding to the HARQProcessBundleTimer have not been toggled.

In some embodiments, a repetition sequence is scheduled in a transmission period. However, to reduce the delay of transmission time and to ensure completely transmitting a repetition sequence, the base station 22 may configure a plurality of repetition sequence in a transmission period, wherein the starting time of the plurality of repetition sequence comprises a time offset, and when there is uplink data that needs to be transmitted, the user equipment 21 may choose the repetition sequence with the minimum waiting time to perform the uplink transmissions.

Figure 9:
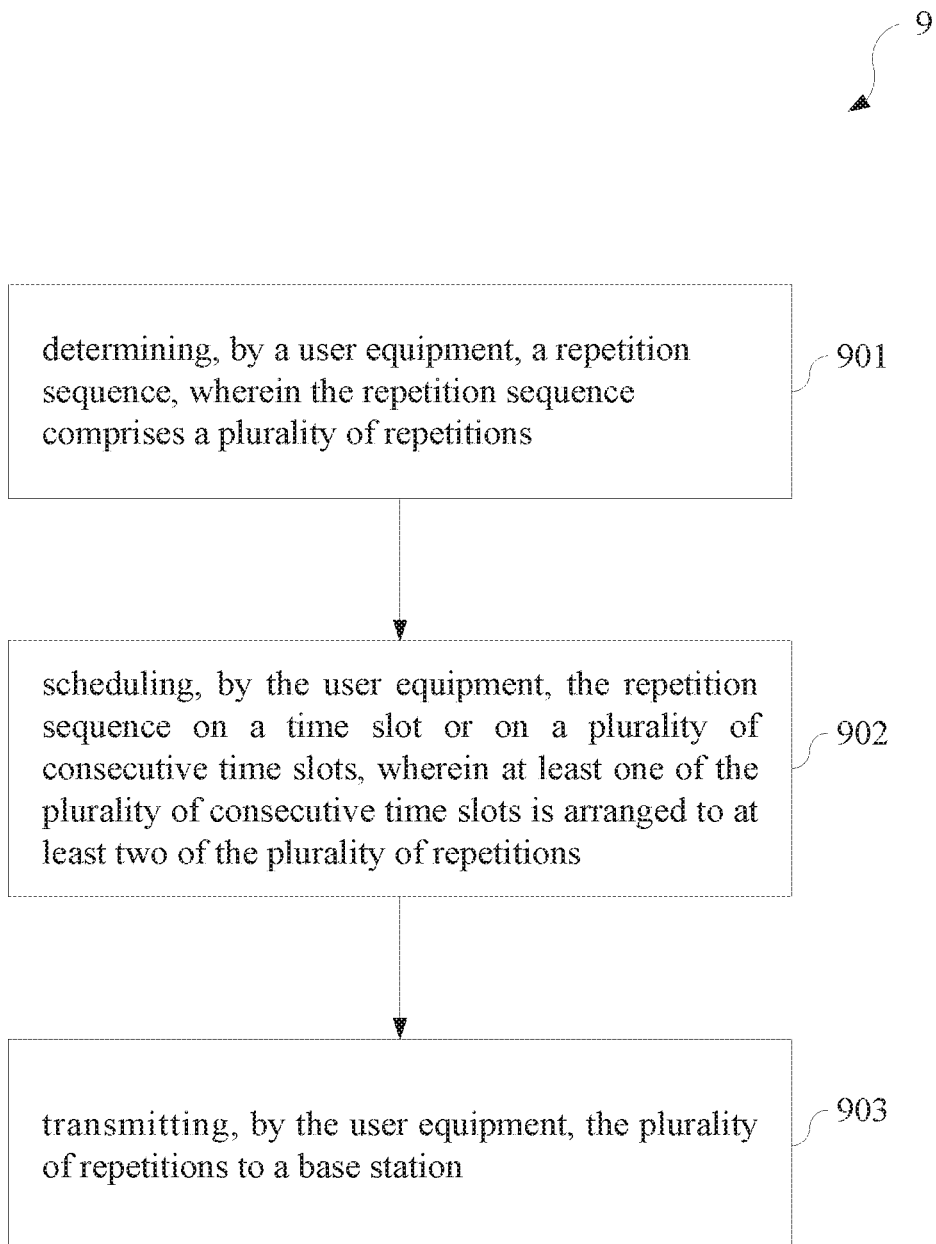
FIG. 9 depicts a schematic view of a method for performing repetition according to one or more embodiments of the present invention.

FIG. 9 depicts a schematic view of a method for performing repetition according to one or more embodiments of the present invention. The contents shown in FIG. 9 are merely for explaining the embodiments of the present invention instead of limiting the present invention.

Referring to FIG. 9, a method 9 for performing repetition may comprise the following steps:

determining, by a user equipment, a repetition sequence, wherein the repetition sequence comprises a plurality of repetitions (marked as step 901);

scheduling, by the user equipment, the repetition sequence on a time slot or on a plurality of consecutive time slots, wherein at least one of the plurality of consecutive time slots is arranged to at least two of the plurality of repetitions (marked as step 902); and transmitting, by the user equipment, the plurality of repetitions to a base station (marked as step 903).

In some embodiments, the method 9 for performing repetition may further comprise the following steps:

receiving in advance, by the user equipment, a resource allocation from the base station, wherein the resource allocation is comprised in a Radio Resource Control (RRC) message or Downlink Control Information (DCI), and the resource allocation comprises at least a Starting symbol Length Indication Value (SLIV) and a repetition number; and determining, by the user equipment, the repetition sequence and the starting time point of the repetition sequence according to the resource allocation.

In some embodiments, the method 9 for performing repetition may further comprise the following step: dividing, postponing or dropping, by the user equipment, any one of the plurality of repetitions when the repetition crosses a slot boundary, or when at least one symbol location corresponding to any one of the plurality of repetitions is unusable in the time slot or in the plurality of consecutive time slots.

In some embodiments, the method 9 for performing repetition may further comprise the following steps: dividing, postponing or dropping, by the user equipment, any one of the plurality of repetitions when the repetition crosses a slot boundary, or when at least one symbol location corresponding to any one of the plurality of repetitions is unusable in the time slot or in the plurality of consecutive time slots; and the user equipment receiving an instruction from the base station and determining whether a semi-static flexible symbol of a symbol location corresponding to any one of the plurality of repetitions is usable based on the instruction.

In some embodiments, the method 9 for performing repetition may further comprise the following steps:

dividing, postponing or dropping, by the user equipment, any one of the plurality of repetitions when the repetition crosses a slot boundary, or when at least one symbol location corresponding to any one of the plurality of repetitions is unusable in the time slot or in the plurality of consecutive time slots; and dropping, by the user equipment, all repetitions that are not yet scheduled when the number of postponing repetitions exceeds a maximum number of postponement.

In some embodiments, the method 9 for performing repetition may further comprise the following steps:

dividing, postponing or dropping, by the user equipment, any one of the plurality of repetitions when the repetition crosses a slot boundary, or when at least one symbol location corresponding to any one of the plurality of repetitions is unusable in the time slot or in the plurality of consecutive time slots; and performing, by the user equipment, a Redundancy Version (RV) mapping to the plurality of repetitions according to a preset rule.

In some embodiments, the method 9 for performing repetition may further comprise the following step: performing, by the user equipment, a Redundancy Version mapping to the plurality of repetitions according to a preset rule.

In some embodiments, regarding the method 9 for performing repetition, the user equipment transmits the plurality of repetitions in a transmission period or across a plurality of transmission periods In some embodiments, regarding the method 9 for performing repetition, the repetition sequence is based on configured-grant transmission. Moreover, the plurality of repetitions correspond to the same hybrid automatic repeat request (HARQ) process ID.

In some embodiments, regarding the method 9 for performing repetition, the repetition sequence is based on configured-grant transmission. Moreover, the method 9 for performing repetition may further comprise the following steps: receiving, by the user equipment, an HARQ acknowledgement (HARQ ACK) from the base station; and terminating, by the user equipment, the remaining repetitions of the repetition sequence according to the HARQ ACK.

In some embodiments, regarding the method 9 for performing repetition, the HARQ ACK corresponds to one or more HARQ processes. Moreover, the method 9 for performing repetition may further comprise the following step: stopping, by the user equipment, a configured-grant timer related to the one or more HARQ processes according to the HARQ ACK.

In some embodiments, the method 9 for performing repetition may be implemented with the user equipment 21. The way of implementing the method 9 for performing repetition with the user equipment 21 can be directly understood by people having ordinary skill in the art based on the aforesaid descriptions for the user equipment 21, and therefore will not be further described herein.

The above disclosure is related to the detailed technical contents and inventive features thereof. People of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment, comprising:
a processor, being configured to:
  determine a repetition sequence, wherein the repetition sequence comprises a plurality of repetitions; and
  schedule the repetition sequence on a time slot or on a plurality of consecutive time slots, wherein the time slot or at least one of the plurality of consecutive time slots is arranged to contain at least two of the plurality of repetitions; and
a transceiver electrically connected with the processor, being configured to transmit the plurality of repetitions to a base station;
wherein when any one of the plurality of repetitions crosses a slot boundary, or when at least one symbol location corresponding to any one of the plurality of repetitions is unusable in the time slot or in the plurality of time slots, the processor is further configured to:
  divide the repetition into a former partition and a latter partition;
  transmit the former partition via the transceiver; and
  postpone or drop the latter partition.

2. The user equipment of claim 1, wherein:
the transceiver is further configured to receive a resource allocation from the base station in advance, wherein the resource allocation is comprised in a Radio Resource Control (RRC) message or Downlink Control Information (DCI), and the resource allocation comprises at least a Starting symbol Length Indication Value (SLIV) and a repetition number; and the processor is further configured to determine the repetition sequence and the starting time point of the repetition sequence according to the resource allocation.

3. The user equipment of claim 1, wherein the transceiver is further configured to receive an instruction from the base station, and determine, based on the instruction, whether a semi-static flexible symbol of a symbol location corresponding to any one of the plurality of repetitions is usable.

4. The user equipment of claim 1, wherein the processor drops all repetitions that are not yet transmitted when the number of postponing repetitions exceeds a maximum number of postponement.

5. The user equipment of claim 1, wherein the processor is further configured to perform a Redundancy Version (RV) mapping to the plurality of repetitions according to a preset rule.

6. The user equipment of claim 1, wherein the transceiver transmits the plurality of repetitions in a transmission period or across a plurality of transmission periods.

7. The user equipment of claim 1, wherein:

the repetition sequence is based on configured-grant transmission; and the plurality of repetitions correspond to the same hybrid automatic repeat request (HARQ) process.

8. The user equipment of claim 1, wherein:

the repetition sequence is based on configured-grant transmission; and the transceiver is further configured to receive an HARQ acknowledgement (HARQ ACK) from the base station, and terminate the remaining repetitions of the repetition sequence according to the HARQ ACK.

9. The user equipment of claim 8, wherein the HARQ ACK corresponds to one or more HARQ processes, and the processor is further configured to stop a configured-grant timer related to the one or more HARQ processes according to the HARQ ACK.

10. A method for performing repetition, comprising:

determining, by a user equipment, a repetition sequence, wherein the repetition sequence comprises a plurality of repetitions;

scheduling, by the user equipment, the repetition sequence on a time slot or on a plurality of consecutive time slots, wherein the time slot or at least one of the plurality of consecutive time slots is arranged to contain at least two of the plurality of repetitions; and transmitting, by the user equipment, the plurality of repetitions to a base station;

wherein when any one of the plurality of repetitions crosses a slot boundary, or when at least one symbol location corresponding to any one of the plurality of repetitions is unusable in the time slot or in the plurality of time slots, the method for performing repetition further comprises:

dividing the repetition into a former partition and a latter partition by the user equipment;

transmitting the former partition by the user equipment; and postponing or dropping the latter partition by the user equipment.

11. The method for performing repetition of claim 10, further comprising:

receiving in advance, by the user equipment, a resource allocation from the base station, wherein the resource allocation is comprised in a Radio Resource Control (RRC) message or Downlink Control Information (DCI), and the resource allocation comprises at least a Starting symbol Length Indication Value (SLIV) and a repetition number; and determining, by the user equipment, the repetition sequence and the starting time point of the repetition sequence according to the resource allocation.

12. The method for performing repetition of claim 10, further comprising:

receiving, by the user equipment, an instruction from the base station; and determining, by the user equipment, whether a semi-static flexible symbol of a symbol location corresponding to any one of the plurality of repetitions is usable based on the instruction.

13. The method for performing repetition of claim 10, further comprising: dropping, by the user equipment, all repetitions that are not yet transmitted when the number of postponing repetitions exceeds a maximum number of postponement.

14. The method for performing repetition of claim 10, further comprising: performing, by the user equipment, a Redundancy Version (RV) mapping to the plurality of repetitions according to a preset rule.

15. The method for performing repetition of claim 10, wherein the user equipment transmits the plurality of repetitions in a transmission period or across a plurality of transmission periods.

16. The method for performing repetition of claim 10, wherein:

the repetition sequence is based on configured-grant transmission; and the plurality of repetitions correspond to the same hybrid automatic repeat request (HARQ) process.

17. The method for performing repetition of claim 10, wherein the repetition sequence is based on configured-grant transmission; and the method for performing repetition further comprises:

receiving, by the user equipment, an HARQ acknowledgement (HARQ ACK) from the base station; and terminating, by the user equipment, the remaining repetitions of the repetition sequence according to the HARQ ACK.

18. The method for performing repetition of claim 17, wherein the HARQ ACK corresponds to one or more HARQ processes, and the method for performing repetition further comprises: stopping, by the user equipment, a configured-grant timer related to the one or more HARQ processes according to the HARQ ACK.

* * * * *